United States Patent [19]

Holm et al.

[11] 4,036,300
[45] July 19, 1977

[54] MICELLAR FLOODING PROCESS

[75] Inventors: LeRoy W. Holm; Donald H. Ferr, both of Fullerton, Calif.

[73] Assignee: Union Oil Company of California, Brea, Calif.

[21] Appl. No.: 699,199

[22] Filed: June 23, 1976

[51] Int. Cl.$^2$ .............................................. E21B 43/22
[52] U.S. Cl. .................................. 166/273; 166/274; 252/8.55 D
[58] Field of Search ........... 166/273, 274, 275, 305 R; 252/8.55 D

[56] References Cited

U.S. PATENT DOCUMENTS

| | | | |
|---|---|---|---|
| 2,877,848 | 3/1959 | Case | 166/274 X |
| 3,302,712 | 2/1967 | Townsend et al. | 166/273 |
| 3,343,597 | 9/1967 | Gogarty et al. | 166/273 |
| 3,491,834 | 1/1970 | Ahearn et al. | 166/273 |
| 3,500,921 | 3/1970 | Abrams et al. | 166/273 |
| 3,500,922 | 3/1970 | O'Brien et al. | 166/273 |
| 3,502,147 | 3/1970 | Hill et al. | 166/274 |
| 3,522,844 | 8/1970 | Abdo | 166/273 X |
| 3,660,287 | 5/1972 | Quattrini | 166/305 R X |
| 3,688,844 | 9/1972 | Roszelle | 166/274 |

Primary Examiner—Stephen J. Novosad
Assistant Examiner—George A. Suchfield
Attorney, Agent, or Firm—Richard C. Hartman; Dean Sandford; John E. Vanderburgh

[57] ABSTRACT

A process for the recovery of petroleum from a subterranean formation by the injection of a micellar displacement system consisting of a micellar solution and aqueous phase including the ammonium or alkali metal salt of an aminopolycarboxylic acid as a chelating agent. The chelating agent is present in concentrations in excess of the stoichiometric amount required to chelate the multivalent ion of the aqueous phase.

30 Claims, No Drawings

MICELLAR FLOODING PROCESS

BACKGROUND

This invention relates to the recovery of petroleum from subterranean petroleum reservoirs and more particularly to an improved miscible flooding process for recovering petroleum from subterranean formations.

It has long been recognized that substantial amounts of petroleum remain unrecovered in the reservoir at the completion of normal primary recovery operations. Hence, various secondary methods of recovering additional quantities of oil have been proposed, such as the well-known technique of waterflooding in which water is injected into the reservoir through an injection well to drive additional oil toward one or more production wells spaced apart in the reservoir from the injection well. Although an additional quantity of oil often can be recovered by waterflooding, the efficiency of the waterflood and the ultimate oil recovery can be further improved by introducing into the reservoir prior to the floodwater a petroleum displacement system that is miscible with both the reservoir oil and with the floodwater.

These displacement systems are generally admixtures of a liquid hydrocarbon, one or more surface active agents, and a stabilizing agent and may contain water up to the concentration at which the water-in-oil microemulsion inverts to an oil-in-water emulsion. Alternatively, the displacement system may comprise a separate slug of the liquid hydrocarbon and admixed agents followed by a slug of low salinity water which may also include a thickening agent and the like.

While flooding processes utilizing a miscible displacement system (often referred to as "micellar flooding,", "soluble oil flooding" or "tertiary recovery") can obtain high oil recoveries under controlled laboratory conditions, it has been found that under field conditions petroleum recoveries are substantially lower than would be expected from the laboratory tests and, in some cases, may be so low as to render the recovery operation uneconomical. One major factor in the reduced petroleum recovery efficiency under field conditions may be the incompatibility of the miscible system with certain cations encountered in the formation, such as calcium, magnesium, barium, iron and the like. Recognizing that the presence of these cations in the reservoir may be harmful to the displacement system, certain procedures such as preflushing have been suggested as effective in reducing the cation content in the reservoir by diluting or displacing the reservoir free water prior to the injection of the solvent system. However, such treatments do not completely eliminate the multivalent cation content of the reservoir clay or of the connate water which is bound as a film about the grains of the granular reservoir rock. Consequently, enough cations are still present to adversely affect the micellar slug.

SUMMARY OF THE INVENTION

Briefly, the present invention resides in a petroleum recovery process employing an improved micellar displacement system which is effective even in presence of multivalent cations. More particularly, the micellar displacement system includes a micellar solution phase and an aqueous phase incorporating an aminopolycarboxylic acid chelating agent or the ammonium or alkali metal salts thereof. The chelating agent is present in an amount in excess of the stoichiometric amount required to chelate the polyvalent cations of the aqueous phase. Preferably the chelating agent is utilized as its ammonium or alkali metal salt and is present in an amount sufficient to maintain the aqueous phase at a pH of at least about 9. This amount normally comprises a large excess over the amount required to chelate the multivalent ions of the aqueous phase. Among the preferred chelating agents are the tetrasodium salt of the ethylenediaminetetraacetic acid and the trisodium salt of nitrilotriacetic acid.

In accordance with the method of the invention, the micellar displacement system, including the chelating agent, is injected into the reservoir through at least one injection well. This is followed by an aqueous flooding medium which also may contain the chelating agent and which is injected into reservoir to drive the displacement system toward one or more spaced production wells for recovery of the reservoir fluids.

DETAILED DESCRIPTION OF THE INVENTION

As used herein the term "micellar displacement system" is used to designate a liquid displacement medium comprising an oil-water micellar solution phase and a low-salt ($<1\%$) content aqueous phase; the aqueous phase having a pH of at least about 9. The aqueous phase may be admixed with the micellar solution phase, alternately injected with the micellar solution, or may be injected into the reservoir immediately following the micellar solution as will be described in more detail hereinafter. In addition, the aqueous phase may contain a thickening agent, such as a gel or water-soluble polymer, to increase its viscosity.

In accordance with the present invention, the aqueous phase of the micellar displacement system comprises a low-salt content water together with an aminopolycarboxylic acid chelating agent, preferably as a water soluble salt, in an amount in excess of that required to chelate the polyvalent metal cations present in the water.

Low-salt content water includes fresh water having a low-salt content, and more particularly fresh water having less than 1.0 weight percent total dissolved salts. Further, it is preferred that the low-salt content water contain less than 0.6 weight percent (6000 ppm) of total dissolved salts. Also, the presence of large concentrations of the salts of multivalent cations, such as calcium, magnesium, and iron are particularly detrimental and it is preferred that the low-salt content water have a low multivalent metal salt content. In particular, it is preferred that this water contain less than 0.05 weight percent (500 ppm) of salts of multivalent cations, and more preferably, less than 0.01 weight percent (100 ppm) of these salts.

The aminopolycarboxylic acid, which term includes the water soluble salts thereof, as mentioned, is present in an amount in excess of that required to bind the multivalent metal cations present in the water making up the aqueous phase. Depending upon the salt content of the aqueous phase and the reservoir, the aminopolycarboxylic acid may range from as little as 0.01 weight percent to 2.0 weight percent or greater. In view of the economics it is preferred practice to utilize a reasonable excess of chelating agent based upon the multivalent ion content of the reservoir. It should be clear, however, that extremely large excesses of chelating agent, although wasteful of the chelating agent, are not harmful to the process. A preferred range of chelating agent is between about 0.1 weight percent and about 0.7 weight percent.

It is preferred that the pH of the aqueous phase be maintained at 9 or greater. This is advantageously accomplished in the present invention by utilizing the ammonium or alkali metal salt of the aminopolycarboxylic acid. The salt is thus added to the aqueous phase water until the pH is adjusted to about 9 or above, preferably between 9 and about 10. The precise amount of the ammonium or alkali metal salt required will, or course, vary with the nature of the water and with the particular aminopolycarboxylic acid salt used to form the aqueous phase of the micellar displacement system. As an alternative, the aminopolycarboxylic acid can be introduced to the water in the free acid form and the pH of the resultant solution adjusted to the desired level with a basic material such as ammonium, sodium or potassium hydroxide. Addition of the chelating agent in the salt form is preferred, however, since the handling of separate solutions is avoided and because the salt form is generally more soluble than the free acid form.

The exact reason for the improved petroleum recovery achieved by the method of this invention is not fully understood although it has been recognized that multivalent metal cations, particularly calcium, magnesium and iron, tend to cause a separation of the components of micellar displacement system. In addition, the micellar displacement systems are believed to be most efficient at pH 9 or above, probably because of reduced adsorption of surfactant by the formation rock. Multivalent metal cations, however, will react with the hydroxyl groups of a displacement system to form insoluble precipitates, thus removing the hydroxyl groups and lowering the pH of the displacement system. Most likely it is a combination of the foregoing factors which lowers the effectiveness of the micellar displacement system. Since multivalent cations may be found in the connate water and in the clays of the formation, it is substantially impossible to eliminate their contact with the micellar displacement system, even by elaborate and expensive preflush techniques. Accordingly, it is believed that the excess chelating agent in the aqeuous phase of the displacement system serves to bind the multivalent cations encountered in the formation and thus inhibit the detrimental effect of these cations on the displacement system while still maintaining a high pH system.

Any of the aminopolycarboxylic acid chelating agents can be used in the present invention such as, for example; ethylenediaminetetraacetic acid (EDTA), diethylenetriaminepentaacetic acid (DTPA), cyclohexane trans-1,2-diamine-tetraacetric acid (CDTA) ethanoldiglycine (EDG), diethanolglycine (DEG), hydroxyethyl-ethylene-diaminetriacetic acid (HEDTA), ethylene bis [2-(o-hydroxyphenyl)-glycine], and nitrilotriacetic acid (NTA). Typically these materials are supplied commercially as the sodium salt although the potassium or ammonium salts are also available and are used with good results. In any event the free acid is readily converted to the salt form by admixture of a water solution of the acid with ammonium, potassium or sodium hydroxide. In addition, all or only a portion of the carboxy sites in the molecule need be substituted with the ammonium or alkali metal cation. Taking for example the sodium salt of EDTA, the di- and trisodium salts are useful although the tetrasodium salt is preferred.

The above-mentioned chelating agents are available commercially and the various methods for their preparation, including the ammonium and alkali metal salts thereof, are well known in the art.

The other primary component of the displacement system is the micellar solution comprising a surfactant dispersed in a liquid external phase in which the concentration of the surfactant is equal to or in excess of the critical miceller concentration (CMC). The term "critical micelle concentration" (CMC) is a term well understood in the art and means the surfactant concentration at which micelles begin to form in a system comprising solvent, surfactant and possibly other solutes. The CMC will vary depending upon the surfactant, solvent and the physical environment, i.e., temperatures, electrolyte concentration and the like. The CMC for a particular system is readily ascertained according to known techniques such as measurement of conductivity, detergency and the like; which properties undergo definite changes at the CMC of the system.

The micellar solution can have either an oleaginous or aqueous liquid external phase, and water or oil, respectively, can also be present as a dispersed phase in the liquid external phase.

The oleaginous compositions, such as the anhydrous oils and water-containing soluble oils, are miscible with the reservoir oil and have the capability of spontaneously emulsifying water when contacted thereby. These oil-external micellar solutions comprise admixtures of a liquid hydrocarbon (oil), one or more selected surface active alkyl aryl sulfonates in an amount exceeding the CMC, and, typically, a minor proportion of an organic liquid stabilizing agent. The emulsions formed by the addition of water to the oil are of the water-in-oil type in that at water concentrations less than the inversion concentration, oil is the continuous or liquid external phase and the water is dispersed in the oil in the form of very fine droplets, or micelles, which are less than 0.1 micron in size and usually range in size from about 100 to 600 A. These emulsions are generally transparent in appearance, and are stable in that they remain as microemulsions on aging. By transparent, it is meant that the microemulsions do not have a cloudy or opaque appearance, even though they may contain color bodies. It is recognized of course that some cloudiness may appear at certain concentrations without adversely affecting the utility of the microemulsions as miscible displacement agents. Emulsions of this type are designated microemulsions to distinguish them from ordinary water-in-oil macroemulsions in which the lower limit of particle size of the water droplets in about 0.1 micron. At water concentrations above the inversion concentration, the emulsion inverts to an emulsion of the oil-in-water type in which droplets of oil are dispersed in a continuous water phase.

The particular liquid hydrocarbon employed in formulating the oleaginous micellar solution in part determines the viscosity and other properties of the micellar displacement system, including the mobility of the micellar system in the reservoir, which affect the efficiency of the oil recovery process. Suitable liquid hydrocarbons include crude petroleum, such as petroleum previously recovered from the reservoir, or other conveniently available crude petroleum; distillate petroleum fractions such as refined or semi-refined petroleum products, such as gasoline, naphtha, stove oil, diesel and gas oil; residual products obtained by the distillation of lower boiling fractions from a crude petroleum, such as bunker fuel oil and other residual products; and low value refinery by-products, such as catalytic cycle oil, lube oil extract, and the like; and liquefied normally gaseous hydrocarbons, such as propane, butane and LPG. While micellar solutions can be prepared from any of these hydrocarbon materials, in many applications it is preferred to employ micellar solutions compounded with crude petroleum, and particularly with crude petroleum having an API gravity between about 27° and 50°.

The aqueous micellar solutions, such as the water-external microemulsions and aqueous micellar surfactant solutions, are miscible with water and have the capability of spontaneously emulsifying oil when contacted thereby. These water-external micellar solutions comprise water and one or more surface active agents in an amount that exceeds the critical micelle concentration, and can optionally include a minor proportion of an organic liquid stabilizing agent. The emulsions formed by the addition of oil to the aqueous micellar dispersion are of the oil-in-water type in that at oil concentrations less than the inversion concentration, water is the continuous or liquid external phase and the oil is dispersed in the water in the form of droplets, or emulsions, which can be either macroemulsions or thermodynamically stable microemulsions. At oil concentrations above the inversion concentration, the oil-in-water emulsion inverts to an emulsion of the water-in-oil type in which droplets of water are dispersed in a continuous oil phase.

Various surfactant compositions and their method of preparation are well known and any of the commercially available surfactant compositions can be used to form the micellar solutions. Among the preferred surfactants, however, are the higher alkyl aryl sulfonates. These sulfonates are preferably in the form of their sodium salts although other salts can be used.

The alkyl aryl sulfonates can be classified as preferentially oil-soluble (oil-soluble) and preferentially water-soluble (water-soluble) on the basis of molecular weight. The oil-soluble sulfonate has a molecular weight above about 400 while the water-soluble sulfonate is less than about 400. It should be clear, however, that an oil-soluble sulfonate will exhibit some solubility in water while a water-soluble sulfonate will likewise exhibit some solubility in oil. It is highly preferred to incorporate both oil-soluble and water-soluble sulfonates in the micellar solution and good results are achieved using a mixture of between about 1 to about 15 parts of oil-soluble sulfonate to 1 part of water-soluble sulfonate.

The alkyl aryl sulfonates and their method preparation are well known in the art although a preferred source of both the oil-soluble and water-soluble sulfonates are the "natural petroleum sulfonates". The term "natural petroleum sulfonates" is a commercial designation for sulfonates obtained by the sulfonation of petroleum fractions, particularly solvent treated aromatic fractions, with sulfuric acid, fuming sulfuric acid or sulfur trioxide.

Both the aqueous and the oleaginous micellar solutions can also include one or more stabilizing agents to improve the properties and stability of the resulting emulsions formed upon the oleaginous or aqueous micellar solution contacting water or oil respectively. Among the useful stabilizing agents are partially oxygenated hydrocarbons such as monohydric and polyhydric alcohols, ketones, ethers, polyhydric alkyl ethers and oxyalkylated alcohols. More specifically, the stabilizing agents include the monohydric aliphatic alcohols containing 2 to 3 carbon atoms, aliphatic ketones containing 4 to 6 carbon atoms, glycol ethers containing 4 to 10 carbon atoms, dialkylene glycols containing 4 to 6 carbon atoms, and oxyalkylated alcohols containing 8 to 18 carbon atoms. For example, agents found particularly useful include isopropyl alcohol, secondary butyl alcohol, methyl ethyl ketone, ethylene glycol monoethyl ether, ethylene glycol monobutyl ether, diethylene glycol monobutyl ether, and diethylene glycol hexyl ether. A specific oxyalkylated alcohol found useful is hexaethyoxylated hexyl alcohol.

The oleaginous micellar solutions comprise mixtures of about 30 to 90 volume percent of the liquid hydrocarbon; 0.5 to 8 volume percent of the stabilizing agent, such as one of the above-described partially oxygenated organic liquids, or a mixture of these liquids; and surface active alkyl aryl sulfonates in excess of the CMC, typically between about 4 and about 30 volume percent. As mentioned, it is preferred that the surface active materials comprise both oil-soluble and water-soluble organic sulfonates in the previously disclosed proportions. These oleaginous micellar solutions can contain water present in the form of a water-in-oil microemulsion in an amount up to that amount causing inversion to an oil-in-water emulsion, which is typically at least about 50 volume percent. Also, where the liquid hydrocarbon has a relatively high viscosity, an additional quantity of low viscosity light liquid hydrocarbon can be added to increase the mobility of the resulting soluble oil to obtain a more favorable mobility ratio between the soluble oil and the following drive fluid. The light hydrocarbon will usually not constitute more than about 25 volume percent of the resulting soluble oil.

The aqueous micellar solutions comprise mixtures of about 75 to 98 volume percent water and 2 to 25 volume percent of surface active alkyl aryl sulfonates, and preferably surface active materials containing both preferentially oil-soluble and preferentially water-soluble organic sulfonates in the previously disclosed proportions. These aqueous micellar solutions can contain oil present in the form of an oil-in-water emulsion in an amount up to that amount causing inversion to a water-in-oil emulsion, which is typically at least about 25 volume percent. Also, the aqueous micellar solution can optionally contain about 0.5 to 8 volume percent of the stabilizing agent.

The micellar solutions are prepared by any of the conventional techniques. For example, an oleaginous micellar solution is prepared by admixing the hydrocarbon base stock, the stabilizing agent and the oil-soluble surface active material. Thereafter, the water-soluble surface active material, if used, is added. Water-in-oil microemulsions can be prepared by simply adding a desired amount of water to the substantially anhydrous oleaginous micellar solution, or larger amounts of water can be added to form an oil-in-water microemulsion. The aqueous micellar solution can be prepared by simply admixing suitable proportions of water, the selected surfactant, and optionally, the organic stabilizing agent. Preferably, the water employed in forming the microemulsion is a salt-containing fresh water having a dissolved salt content of less than about 15,000 ppm, and more preferably less than about 5,000 ppm. Water-soluble salts of a monovalent metal, such as for example sodium or potassium chloride, can be added to obtain a water having a desired salt content.

In carrying out the recovery of petroleum according to the invention, the micellar displacement system is injected into the reservoir in an amount sufficient to establish in the reservoir a reservoir oil displacement bank. Typically this amount will range between about 0.01 and 0.15 reservoir pore volume. The micellar solution and aqueous phase may be premixed as a water external microemulsion or may be injected as separate components either simultaneously, in alternate slugs or in successive alternate slugs, with the micellar solution slug preceding the aqueous phase slug. Normally the volume ratio of micellar solution to the aqueous phase is 1:1, although this may be varied depending upon the nature of the reservoir formation, the brine content of the reservoir free water and connate water, reservoir porosity and other similar factors.

Following injection of the micellar displacement system, an aqueous flooding media in injected to move the displacement bank toward at least one production well spaced apart in the reservoir, from which fluids are produced in a conventional manner. The aqueous flooding medium can comprise water or brine, and can be made more viscous by the addition of a thickening agent such as sugar, dextran, carboxymethylcellulose, amines, glycerine, guar gum, and mixtures of these agents. Also, the aqueous flooding medium can be rendered more viscous by the addition of a small amount of a water-soluble polymer, such as hydroxyethyl cellulose or polyacrylamide, and particularly a partially hydrolyzed polyacrylamide. In a preferred method of practicing this invention, thickening agent is added to only an initial portion of the flood water.

It is also within the scope of the method of the invention to employ a preflush for the purpose of displacing reservoir free brine or to otherwise improve the efficiency of the micellar displacement system. Thus, in accordance with techniques well known in the art, solutions can be injected ahead of the micellar displacement system to increase porosity or to selectively plug low porosity areas around the injection well and the like.

The invention is further illustrated by the following examples which, although disclosing specific modes of practicing the invention, are not intended as limiting the scope of the invention as defined by the appended claims.

EXAMPLES 1–5

The following laboratory scale flooding tests are conducted to demonstrate the improvement in oil recovery utilizing a micellar displacement system when the aqueous phase of that system incorporates a chelating agent in accordance with the present invention.

The cores employed in the examples are one and one-half inch by one and one-half inch by four feet long sandstone. Each core is first saturated with Chesney brine comprising 95,000 ppm total salt content, and including 2800 ppm calcium ion and 1500 ppm magnesium ion. Following the brine saturation the core is then saturated with a 37° API Kansas (Greenwood County) crude oil and flooded with the Chesney brine to residual oil saturation.

The oil recovery operation is conducted by injecting 0.0375 pore volume of the micellar displacement system followed by 0.6 pore volume of water containing a water-soluble polyacrylamide exhibiting a Brookfield viscosity of between about 29 cps and about 33 cps at 6 rpm. The polyacrylamide resin is identified as Q41-F which is marketed by The Nalco Company. The cores are then flooded with tap water until no further oil is produced from the core.

The micellar displacement system utilized in each of the examples in an oil external microemulsion formed by the admixture of the following:

| | Micellar Solution |
|---|---|
| 38.2 | volume percent Greenwood County crude petroleum |
| 3.46 | volume percent oil-soluble sulfonate[1] |
| 0.53 | oil soluble sulfonate[2] |
| 2.18 | volume percent oil soluble sulfonate[3] |
| 4.26 | water soluble sulfonate[4] |
| 1.37 | volume percent stabilizer (butylcellosolve) |
| | Aqueous Phase |
| 2.0 | volume percent Chesney brine |
| 48 | volume percent water[5] |

[1] An alkyl-aryl sulfonate having an average molecular weight of about 565, marketed by WITCO Chemical Co. under the trademark HMW.
[2] An alkyl-aryl sulfonate having an average molecular weight of about 500, marketed by WITCO Chemical Co. under the trademark TRS-18.
[3] An alkyl-aryl sulfonate having an average molecular weight of about 420, marketed by WITCO Chemical Co. under the trademark TRS 10-410.
[4] An alkyl-aryl sulfonate having an average molecular weight of about 350, marketed by WITCO Chemical Co. with the trademark TRS-40.
[5] Total dissolved solids of between 150–200 ppm and about 50 ppm Ca and Mg.

The micellar displacement system is prepared by admixing the crude petroleum and the oil-soluble sulfonates followed by the addition of the water-soluble sulfonate and the butylcellosolve. The aqueous phase is prepared by admixing the water and brine. The aqueous portion is then admixed with the oleaginous portion to form a stable microemulsion.

In Examples 2–5 an aminopolycarboxylic acid chelating agent, the tetrasodium salt of EDTA, is introduced to the aqueous portion prior to its admixture with the oleaginous micellar solution. The tetrasodium salt of EDTA is utilized in a powder form and is commercially available under the trade name HAMP-ENE Na$_4$ marketed by the Dewey and Almy Division of W. R. Grace and Company. The amounts of the tetrasodium salt added range from 0 in Example 1 to 0.7 weight percent in Example 5 and the pH of the aqueous phase ranges from 7.4 in Example 1 to 9.9 in Example 5.

The volume of crude oil recovered from the core during the flooding process with displacement system in each of Examples 1–5 is measured and reported as a percentage of the total petroleum retained in the saturated core. The test results are summarized in Table A below.

Table A

| Example | Weight % EDTA Na$_4$ | pH Aqueous Portion | % Oil Recovery |
|---|---|---|---|
| 1 | 0 | 7.4 | 55.3 |
| 2 | 0.1 | 8.1 | 68.6 |
| 3 | 0.4 | 9.4 | 83.0 |
| 4 | 0.5 | 9.6 | 89.8 |
| 5 | 0.7 | 9.9 | 95.5 |

From Table A it will be seen that a substantial improvement in percent oil recovery is achieved when the EDTA is utilized in the micellar displacement system in excess of the amount required to sequester the multivalent ions of the aqueous phase. Best results are obtained when the amount of EDTA is sufficient to raise the pH of the aqueous phase to 9 and above.

The following tests are run to determine the effect of pH alone on the percent oil recovery and to illustrate that good results are obtained utilizing an excess of EDTA over that required to chelate the polyvalent ions but less than that required to adjust the pH to 9 or above. The final pH adjustment is made with sodium hydroxide.

EXAMPLES 6-7

Berea sandstone cores are prepared as in Example 1-5. The micellar displacement system is likewise prepared as in Examples 1-5 except that in Example 6 the aqueous portion contains no EDTA and the pH is adjusted with sodium hydroxide. In Example 7 the aqueous portion includes 0.25 weight percent EDTA Na$_4$. The pH is adjusted to about 10.0 with sodium hydroxide.

The flooding tests are conducted in the manner described in Examples 1-5. The results are summarized in Table B below.

Table B

| Example | Weight % EDTA Na$_4$ | pH (adjusted with NaOH) | % Oil Recovery |
|---|---|---|---|
| 6 | 0 | 10 | 49.5 |
| 7 | 0.25 | 10 | 89.2 |

The test results indicate that with the pH of the aqueous phase of the displacement system adjusted to 10 but with no chelating agent, the percent oil recovery is less than 50 percent. However, when EDTA is introduced in accordance with the present invention and the pH is adjusted with caustic there is a substantial increase in percent oil recovery.

The following Example illustrates the use of different aminopolycarboxylic acid chelating agents to improve oil recovery.

EXAMPLE 8

A four-foot Berea sandstone core is saturated with Chesney brine and Greenwood County crude petroleum in the same manner as described in Example 1-5. The micellar displacement system is prepared using the composition and proportions of Examples 1-5 except that the aqueous phase includes 0.5 weight percent of the trisodium salt of NTA as the chelating agent and 4000 ppm of NaCl.

The micellar displacement system is prepared, as in Examples 1-5, by forming a mixture of the crude oil and oil-soluble surfactants, adding the water-soluble surfactants, and finally the aqueous NTA containing portion to form a water external microemulsion. The displacement is carried out as in the previous Examples and percent oil recovery is determined to be 89.8%.

EXAMPLES 9-11

The procedures of Examples 1-5 are repeated except that the water portion of the micellar displacement system includes 0.5 percent of the following aminopolycarboxylic acids:

| Example | |
|---|---|
| 9 | Pentasodium salt of diethylenetriamine pentaacetic acid (DTPA) |
| 10 | Tetrasodium salt of cyclohexane trans-1,2-diamine tetraacetic acid (CDTA) |
| 11 | Trisodium salt of hydroxyethyl-ethylenediaminetriacetic acid (HEDTA) |

In each case there is a substantial improvement in the percent oil recovery over the percent oil recovery of Example 1 using no aminocarboxylic acid chelating agent in the micellar displacement system.

From the foregoing it will be seen that the method of the present invention provides an improved flooding process for the recovery of residual petroleum from subterranean reservoirs by the incorporation of an aminopolycarboxylic acid chelating agent in the micellar displacement system in an amount in excess of that required to chelate divalent metal ions present in the displacement system. Preferably, the aminopolycarboxylic acid chelating agent is utilized in its ammonium or alkali metal salt form and is present in sufficient amounts to adjust and maintain the pH of the aqueous portion of the micellar displacement system at a pH of at least about 9.

In addition to the aminopolycarboxylic acid chelating agent in the micellar displacement system, the chelating agent can also be incorporated in the flood water immediately following the micellar displacement system. When so used it is added to at least the initial portion of the flood water that is the portion that is normally thickened, in excess of that amount required to chelate the multivalent cations of the water used. As in the case of the micellar displacement system, the chelating agent is preferably added in sufficient amount to maintain the pH of the initial portion of the flood water at 9 or above and in any event in excess of the amount required to chelate the multivalent ions of the portion of the aqueous flooding medium to which it is added.

Various embodiments and modifications of this invention have been described in the aforegoing description and examples, and further modifications will be apparent to those skilled in the art. Such modifications are included in the scope of this invention as defined by the following claims.

We claim:

1. In a method for recovering petroleum from a subterranean reservoir including the steps of injecting into said reservoir through an injection well a micellar displacement system comprising a micellar solution and an aqueous phase, and thereafter injecting an aqueous flooding medium to drive said micellar displacement system towards a spaced production well from which fluids are recovered, the improvement which comprises:

introducing into said reservoir with said micellar displacement system a chelating agent in an amount in excess of that amount required to chelate multivalent cations contained in said aqueous phase of said micellar displacement system, said chelating agent being selected from the group consisting of aminopolycarboxylic acids, the ammonium salts and the alkali metal salts thereof.

2. The method of claim 1 wherein said chelating agent is introduced into said reservoir simultaneously with said aqueous phase of said micellar displacement system.

3. The method of claim 1 wherein said aqueous phase of said micellar displacement system is adjusted to a pH of about 9 and above prior to the injection thereof into said reservoir.

4. The method of claim 1 wherein said chelating agent is introduced in an amount sufficient to adjust said aqueous phase to a pH of about 9 and above.

5. The method of claim 4 wherein said chelating agent is admixed with said aqueous phase prior to injection.

6. The method of claim 1 wherein said chelating agent is selected from the group consisting of ethylene diaminetetraacetric acid, diethylenetriaminepentaacetic acid, cyclohexane trans -1,2-diaminetetraacetic acid, ethanoldiglycine, diethanolglycine, hydroxyethyl-ethylene-diaminetriacetic acid, ethylene bis [2-(o-hydroxyphenyl)-glycine], nitrilotriacetric acid, the ammonium salts thereof, the alkali metal salts thereof and mixtures thereof.

7. The method of claim 1 wherein said chelating agent is the tetrasodium salt of ethylenediaminetetraacetic acid.

8. The method of claim 1 wherein said chelating agent is the trisodium salt of nitrilotriacetic acid.

9. The method of claim 1 wherein said micellar displacement system is introduced into said reservoir by injecting said micellar solution and thereafter injecting said aqueous phase containing said chelating agent.

10. The method of claim 1 wherein said micellar displacement system is introduced into said reservoir by alternately injecting a portion of said micellar solution followed by a portion of said aqueous phase containing said chelating agent and thereafter repeating said alternate injections of said micellar solution and said aqueous phase.

11. The method of claim 1 wherein said micellar displacement system is introduced into said reservoir as an admixture of said micellar solution and said aqueous phase containing said chelating agent.

12. The method of claim 1 wherein the volume ratio of said micellar solution and said aqueous phase is about 1:1.

13. The method of claim 1 wherein the quantity of said micellar displacement system injected is between 0.01 and 0.15 pore volume of said reservoir.

14. The method of claim 1 further including the step of incorporating said chelating agent in at least a portion of said aqueous flooding medium following said micellar displacement system.

15. A method for recovering petroleum from a subterranean reservoir which communicates with the surface by means of an injection well and at least one spaced production well, the method comprising the steps of:
injecting a micellar displacement system into said reservoir through said injection well, said micellar displacement system comprising a micellar solution and an aqueous phase, said aqueous phase including an aminopolycarboxylic acid salt in an amount in excess of the stoichiometric amount required to chelate multivalent ions in said aqueous phase;
thereafter injecting an aqueous flooding medium into said injection well to drive said micellar displacement system toward said spaced production well; and
recovering fluids from said production well.

16. The method of claim 15 wherein said aminopolycarboxylic acid salt is selected from the group consisting of the ammonium and alkali metal salts thereof.

17. The method of claim 16 wherein said aqueous phase is adjusted to an alkaline pH of at least about 9 by the introduction of said aminopolycarboxylic acid salt.

18. The method of claim 15 wherein said aminopolycarboxylic acid salt is selected from the water soluble salts of ethylene diaminetetraacetic acid, diethylenetriaminepentaacetic acid, cyclohexane trans -1,2-diaminetetraacetic acid, ethanoldiglycine, diethanolglycine, hydroxyethyl-ethylenediaminetriacetic acid, ethylene bis [2-(o-hydroxyphenyl)-glycine] and nitrilotriacetic acid.

19. The method of claim 15 wherein said aminopolycarboxylic acid salt is the tetrasodium salt of ethylenediaminetetraacetic acid.

20. The method of claim 15 wherein said aminopolycarboxylic acid salt is the trisodium salt of nitrilotriacetic acid.

21. The method of claim 15 wherein said micellar solution is injected prior to said aqueous phase.

22. The method of claim 15 wherein said micellar solution and said aqueous phase are injected simultaneously.

23. The method of claim 22 wherein said micellar solution and said aqueous phase are premixed prior to the injection of said micellar displacement system.

24. The method of claim 15 wherein successive alternate portions of said micellar solution and said aqueous phase are injected into said reservoir, said micellar solution portions preceding said aqueous phase portions.

25. A method for the treatment of a subterranean reservoir to enhance petroleum recovery therefrom comprising the steps of:
introducing into said reservoir between about 0.01 and about 1.15 of reservoir pore volume of a micellar solution and an aqueous phase, said aqueous phase including at least about 0.01 weight percent of a chelating agent selected from the group consisting of the ammonium sodium and potassium salts of ethylenediaminetetraacetic acid and nitrilotriacetic acid;
thereafter injecting an aqueous flooding medium to drive said micellar displacement systems towards a production well; and
recovering fluids from said production well.

26. The method of claim 25 wherein said micellar solution and said aqueous phase are admixed prior to the injection thereof into said reservoir.

27. The method of claim 25 wherein between about 0.1 weight percent and about 0.7 weight percent of said chelating agent is present in said aqueous phase.

28. The method of claim 25 wherein said chelating agent is the tetrasodium salt of ethylenediaminetetraacetic acid.

29. The method of claim 25 wherein said chelating agent is the trisodium salt of nitrilotriacetic acid.

30. The method of claim 25 wherein said micellar solution comprises an alkyl-aryl surfactant in a liquid external phase, the concentration of said surfactant being at least the critical micellar concentration.

* * * * *

UNITED STATES PATENT AND TRADEMARK OFFICE
CERTIFICATE OF CORRECTION

PATENT NO. : 4,036,300
DATED : July 19, 1977
INVENTOR(S) : LeRoy W. Holm and Donald H. Ferr It is certified that error appears in the above-identified patent and that said Letters Patent are hereby corrected as shown below:

In claim 25, column 12, line 31, "1.15" should be corrected to read --0.15--.

Signed and Sealed this

Eleventh Day of October 1977

[SEAL]

Attest:

RUTH C. MASON
Attesting Officer

LUTRELLE F. PARKER
Acting Commissioner of Patents and Trademarks